(12) United States Patent
Bordes et al.

(10) Patent No.: US 11,290,730 B2
(45) Date of Patent: Mar. 29, 2022

(54) METHOD AND APPARATUS FOR ADAPTIVE ILLUMINATION COMPENSATION IN VIDEO ENCODING AND DECODING

(71) Applicant: InterDigital VC Holdings, Inc., Wilmington, DE (US)

(72) Inventors: Philippe Bordes, Cesson-Sevigne (FR); Franck Galpin, Cesson-Sevigne (FR); Fabien Racape, Palo Alto, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/650,859

(22) PCT Filed: Oct. 4, 2018

(86) PCT No.: PCT/US2018/054402
§ 371 (c)(1),
(2) Date: Mar. 25, 2020

(87) PCT Pub. No.: WO2019/071001
PCT Pub. Date: Apr. 11, 2019

(65) Prior Publication Data
US 2020/0280727 A1    Sep. 3, 2020

(30) Foreign Application Priority Data

Oct. 5, 2017  (EP) .................................... 17306333
Nov. 21, 2017  (EP) .................................... 17306613

(51) Int. Cl.
*H04N 19/176* (2014.01)
*H04N 19/105* (2014.01)
*H04N 19/52* (2014.01)

(52) U.S. Cl.
CPC ......... *H04N 19/176* (2014.11); *H04N 19/105* (2014.11); *H04N 19/52* (2014.11)

(58) Field of Classification Search
CPC ..... H04N 19/176; H04N 19/105; H04N 19/52
(Continued)

(56) References Cited

U.S. PATENT DOCUMENTS

2013/0022118 A1*  1/2013  Kim ..................... H04N 19/147
                                                375/240.16
2014/0010305 A1*  1/2014  Mironovich ......... H04N 19/597
                                                375/240.16

(Continued)

*Primary Examiner* — Behrooz M Senfi
(74) *Attorney, Agent, or Firm* — Xiaoan Lu

(57) ABSTRACT

Different implementations are described for determining one or more illumination compensation parameters for a current block being encoded by a video encoder or decoded by a video decoder, based on the selection of one or more neighboring samples. The selection of the one or more neighboring samples is based on information used to reconstruct a plurality of neighboring reconstructed blocks. The selection may be based on the motion information, such as motion vector and reference picture information. In one example, only samples from neighboring reconstructed blocks that have (1) the same reference picture index and/or (2) a motion vector close to the motion vector of the current block is selected. In another example, if the current block derives or inherits some motion information from a top or left neighboring block, then only the top or left neighboring samples are selected for IC parameter calculation.

16 Claims, 11 Drawing Sheets

(58) Field of Classification Search
 USPC .................................................. 375/240.16
 See application file for complete search history.

(56) References Cited

U.S. PATENT DOCUMENTS

| | | | |
|---|---|---|---|
| 2015/0146776 A1* | 5/2015 | Koyama | H04N 19/593 |
| | | | 375/240.03 |
| 2016/0366415 A1 | 12/2016 | Liu et al. | |
| 2016/0366416 A1 | 12/2016 | Liu et al. | |
| 2018/0131943 A1* | 5/2018 | Park | H04N 19/122 |
| 2018/0176592 A1* | 6/2018 | Lim | H04N 19/513 |
| 2019/0200021 A1* | 6/2019 | Park | H04N 19/132 |
| 2019/0246133 A1* | 8/2019 | Lee | H04N 19/119 |
| 2021/0051345 A1* | 2/2021 | Tsai | H04N 19/46 |

\* cited by examiner

METHOD AND APPARATUS FOR ADAPTIVE ILLUMINATION COMPENSATION IN VIDEO ENCODING AND DECODING

This application claims the benefit, under 35 U.S.C. § 371 of International Application No. PCT/US18/054402, filed Oct. 4, 2018, which was published on Apr. 11, 2019, which claims the benefit of European Patent Application Nos. EP17306613.5 filed Nov. 21, 2017 and EP17306333.0 filed Oct. 5, 2017.

TECHNICAL FIELD

At least one of the present embodiments generally relates to a method or an apparatus for video encoding or decoding, and more particularly, to a method or an apparatus for determining illumination compensation parameters in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a general aspect of at least one embodiment, a method for encoding video data is presented, comprising: selecting, for a current block being encoded in a picture, one or more neighboring samples from a plurality of neighboring reconstructed blocks of said current block, based on information used to reconstruct said plurality of neighboring reconstructed blocks; determining one or more illumination compensation parameters for said current block, based on said selected one or more neighboring samples; adjusting a prediction block for said current block based on said determined one or more illumination compensation parameters; and encoding said current block using said adjusted prediction block.

According to another general aspect of at least one embodiment, a method for decoding video data is presented, comprising: selecting for a current block being decoded in a picture, one or more neighboring samples from a plurality of neighboring reconstructed blocks of said current block, based on information used to reconstruct said plurality of neighboring reconstructed blocks; determining one or more illumination compensation parameters based on said selected one or more neighboring samples; adjusting a prediction block for said current block based on said determined one or more illumination compensation parameters; and decoding said current block based on said adjusted prediction block.

According to another general aspect of at least one embodiment, an apparatus for encoding video data is presented, comprising: means for selecting, for a current block being encoded in a picture, one or more neighboring samples from a plurality of neighboring reconstructed blocks of said current block, based on information used to reconstruct said plurality of neighboring reconstructed blocks; means for determining one or more illumination compensation parameters for said current block, based on said selected one or more neighboring samples; means for adjusting a prediction block for said current block based on said determined one or more illumination compensation parameters; and means for encoding said current block using said adjusted prediction block.

According to another general aspect of at least one embodiment, an apparatus for decoding video data is presented, comprising: means for selecting for a current block being decoded in a picture, one or more neighboring samples from a plurality of neighboring reconstructed blocks of said current block, based on information used to reconstruct said plurality of neighboring reconstructed blocks; means for determining one or more illumination compensation parameters based on said selected one or more neighboring samples; means for adjusting a prediction block for said current block based on said determined one or more illumination compensation parameters; and means for decoding said current block based on said adjusted prediction block.

According to another general aspect of at least one embodiment, an apparatus for encoding video data is presented, comprising at least a memory and one or more processors, wherein said one or more processors are configured to: select, for a current block being encoded in a picture, one or more neighboring samples from a plurality of neighboring reconstructed blocks of said current block, based on information used to reconstruct said plurality of neighboring reconstructed blocks; determine one or more illumination compensation parameters for said current block, based on said selected one or more neighboring samples; adjust a prediction block for said current block based on said determined one or more illumination compensation parameters; and encode said current block using said adjusted prediction block.

According to another general aspect of at least one embodiment, an apparatus for decoding video data is provided, comprising at least a memory and one or more processors, wherein said one or more processors are configured to: select, for a current block being decoded in a picture, one or more neighboring samples from a plurality of neighboring reconstructed blocks of said current block, based on information used to reconstruct said plurality of neighboring reconstructed blocks; determine, one or more illumination compensation parameters based on said selected one or more neighboring samples; adjust a prediction block for said current block based on said determined one or more illumination compensation parameters; and decode said current block based on said adjusted prediction block.

According to another general aspect of at least one embodiment, said information used to reconstruct said plurality of neighboring reconstructed blocks is also used to reconstruct said current block. To determine said one or more illumination compensation parameters, corresponding neighboring samples in a reference picture for said current block are further used. In one example, said information used to reconstruct said plurality of neighboring reconstructed blocks comprises one or more of: 1) reference picture information of said plurality of neighboring reconstructed blocks and 2) motion vector information of said plurality of neighboring reconstructed blocks.

According to another general aspect of at least one embodiment, said selecting by the apparatus or the method further comprises, for a particular block of said plurality of neighboring reconstructed blocks: determining whether said particular block shares same reference picture as said current block, wherein said particular block is selected based on said determining.

According to another general aspect of at least one embodiment, said selecting by the apparatus or the method further comprises, for a particular block of said plurality of neighboring reconstructed blocks: determining whether a difference between a motion vector value of said particular block and a motion vector value of said current block is less than a threshold, wherein said particular block is selected based on said determining. Said motion vector value of said particular block may be scaled before said difference is determined.

According to another general aspect of at least one embodiment, said selecting by the apparatus or the method further comprises, for a particular block of said plurality of neighboring reconstructed blocks: determining whether said current block inherits said information used to encode or decode said particular block, wherein said particular block is selected based on said determining.

According to another general aspect of at least one embodiment, if said current block inherits or derives encoding or decoding information from a top neighboring reconstructed block of said plurality of neighboring reconstructed blocks, then only neighboring samples above said current block are used for said determining said one or more illumination compensation parameters; or if said current block inherits or derives encoding or decoding information from a left neighboring reconstructed block of said plurality of neighboring reconstructed blocks, then only neighboring samples to the left of said current block are used for said determining said one or more illumination compensation parameters.

According to another general aspect of at least one embodiment, wherein an illumination compensation flag, indicating use of said one or more illumination compensation parameters for encoding or decoding said current block, is predicted from one or more corresponding illumination compensation flags of said plurality of neighboring reconstructed blocks.

According to another general aspect of at least one embodiment, said current block is inter encoded or decoded, using merge mode, advance motion vector prediction (AMVP) mode or Frame Rate-Up Conversion (FRUC) mode. Said current block may also be intra encoded or decoded.

According to another general aspect of at least one embodiment, a bitstream is formatted to include a signal indicating that illumination compensation is used for a current block in a picture; and encoded prediction residuals for said current block, wherein a prediction block for said current block is adjusted based on one or more illumination compensation parameters, wherein said prediction residuals are formed based on said current block and said adjusted prediction residual block, wherein one or more neighboring samples from a plurality of neighboring reconstructed blocks of said current block are selected based on information used to reconstruct said plurality of neighboring reconstructed blocks, and wherein said one or more illumination compensation parameters are determined for said current block, based on said selected one or more neighboring samples.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

Figure 1:
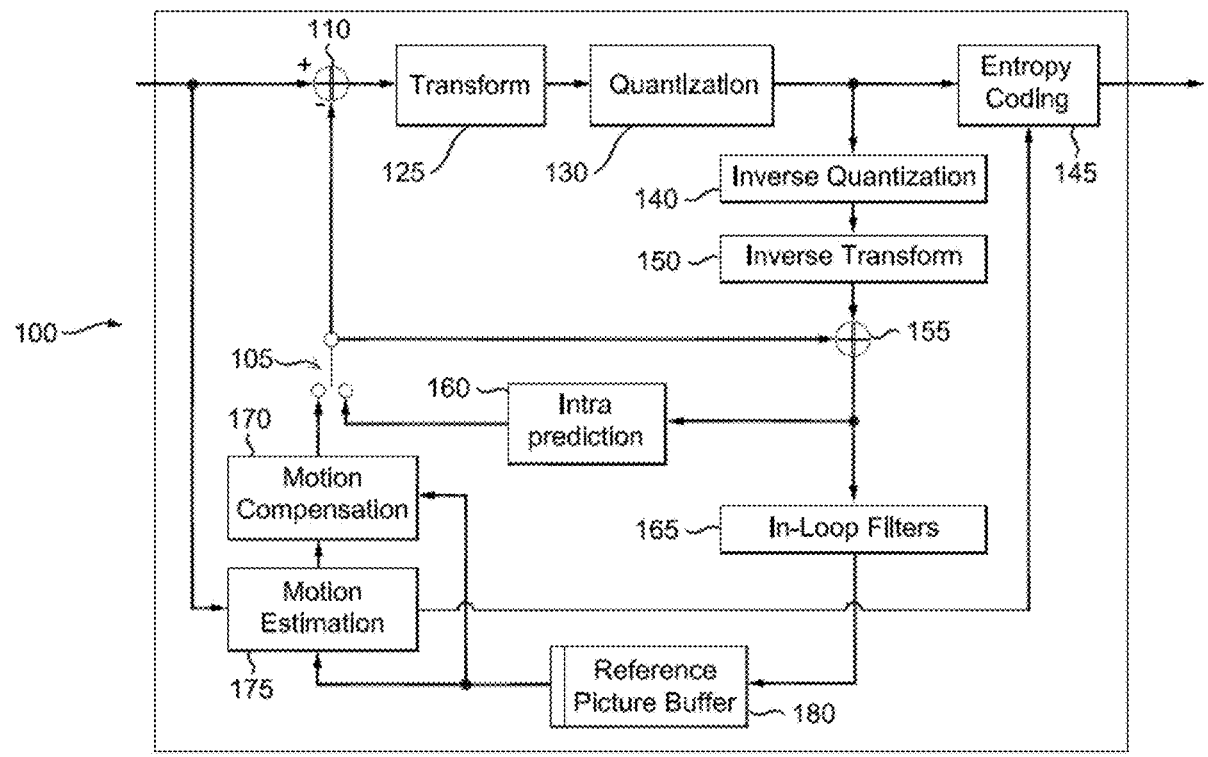
FIG. 1 illustrates a block diagram of an embodiment of a video encoder.

FIG. 1 illustrates an exemplary video encoder 100, such as an High Efficiency Video Coding (HEVC) encoder.

HEVC is a compression standard developed by Joint Collaborative Team on Video Coding (JCT-VC) (see, e.g., "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC.

In the present application, the terms "reconstructed" and "decoded" may be used interchangeably, the terms "encoded" or "coded" may be used interchangeable, and the terms "picture" and "frame" may be used interchangeably. Usually, but not necessarily, the term "reconstructed" is used at the encoder side while "decoded" is used at the decoder side.

In HEVC, to encode a video sequence with one or more pictures, a picture is partitioned into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figure 2A:
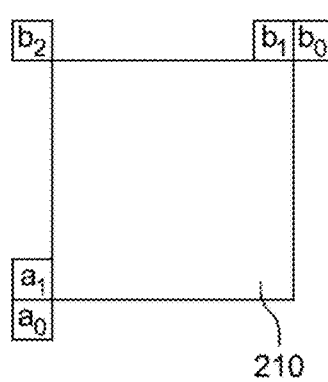
FIG. 2A is a pictorial example depicting the positions of five spatial candidates.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1$, $b_1$, $b_0$, $a_0$, $b_2$, and then the redundancy in candidates is removed.

The motion vector of the collocated location in a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$, can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Figure 2B:
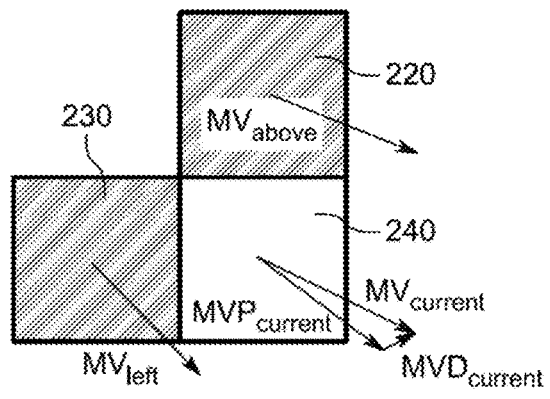
FIG. 2B is a pictorial example depicting motion vector representation using AMVP.

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from $MV_{left}$ and $MV_{above}$ as $MVP_{current}$. A motion vector difference then can be calculated as $MVD_{current}=MV_{current}-MVP_{current}$.

Motion compensation prediction can be performed using one or two reference pictures for prediction. In P slices, only a single prediction reference can be used for Inter prediction, enabling uni-prediction for a prediction block. In B slices, two reference picture lists are available, and uni-prediction or bi-prediction can be used. In bi-prediction, one reference picture from each of the reference picture lists is used.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
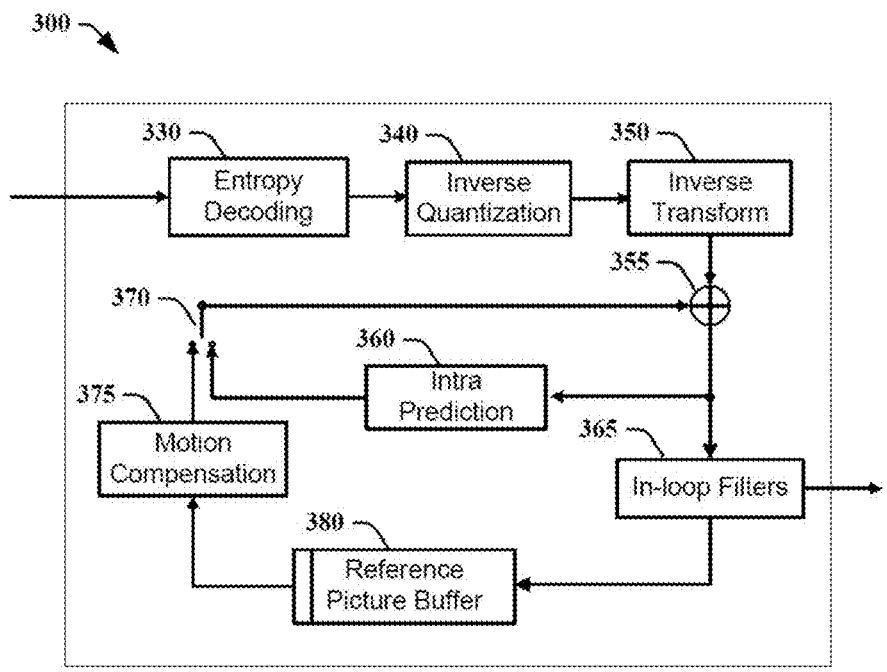
FIG. 3 illustrates a block diagram of an embodiment of a video decoder.

FIG. 3 illustrates a block diagram of an exemplary video decoder 300, such as an HEVC decoder. In the exemplary decoder 300, a bitstream is decoded by the decoder elements as described below. Video decoder 300 generally performs a decoding pass reciprocal to the encoding pass as described in FIG. 1, which performs video decoding as part of encoding video data. FIG. 3 may also illustrate a decoder in which improvements are made to the HEVC standard or a decoder employing technologies similar to HEVC.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

A Frame Rate Up-Conversion (FRUC) mode or derivation, based on frame rate up-conversion techniques, is developed in the reference software JEM (Joint Exploration Model) by the Joint Video Exploration Team (JVET). With the FRUC mode, motion information of a block is derived at the decoder side without explicit syntax for MVP information. The FRUC process is completely symmetric, i.e., the same motion derivation operations are performed, at the encoder and the decoder.

Figure 4:
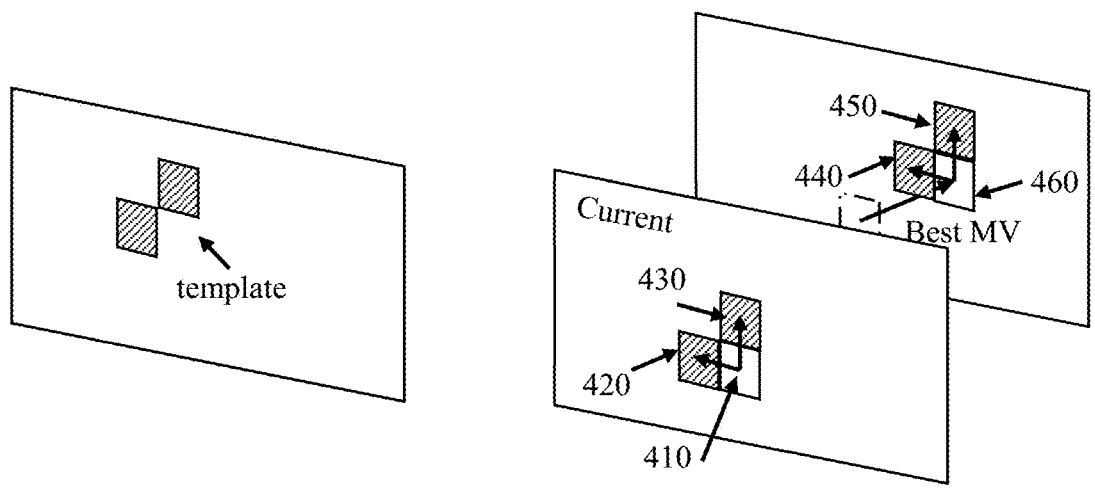
FIG. 4 illustrates using FRUC to derive motion information for a current block.

FIG. 4 illustrates using FRUC to derive motion information for a current block 410. The current block may be in the "merge" or "AMVP" mode. Top and left neighboring blocks of the current block are used as a template. The motion information can be derived by locating the best match between the template (420, 430) of the current block and the template (440, 450) of a block in the reference picture by locating the block (460) with the smallest matching cost, for example, with the smallest SAD (Sum of Absolute Differences) between the templates. Other cost measures than SAD can also be used for calculating the matching cost. In particular, the motion vector can be obtained as the displacement between a collocated block of the current block and the best matching block.

Figure 5:
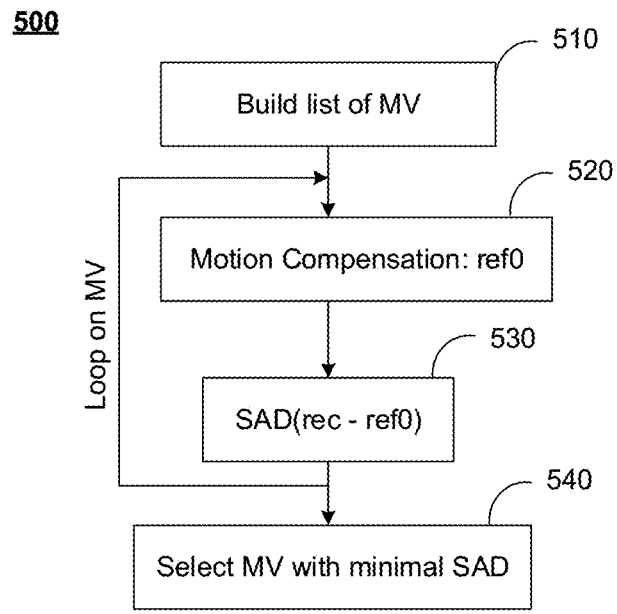
FIG. 5 illustrates an exemplary process for performing motion derivation.

FIG. 5 illustrates an exemplary process 500 of selecting a motion vector in the FRUC mode. At step 510, a list of MV candidates is built. At steps 520 to 540, the MV (best_MV at 540) is selected from the list of MV candidates, in order to minimize the Sum of Absolute Difference (SAD) (530) between the templates (ref0 and rec in 530) for the motion compensated reference block and the current block.

Figure 6:
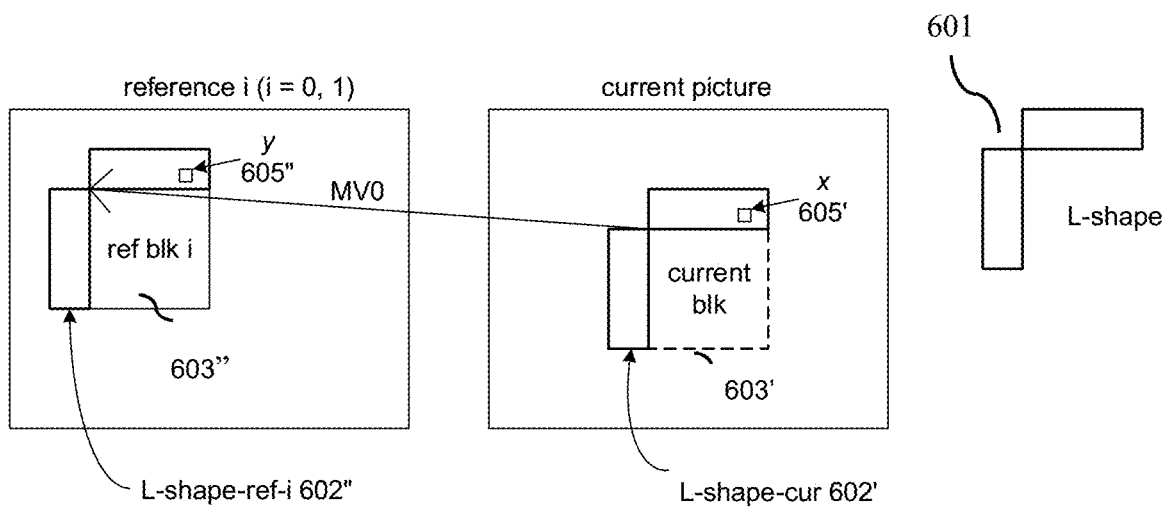
FIG. 6 illustrates conceptually the derivation of illumination compensation (IC) parameters using an L-shape template.

Other recent additions to the video compression technology, such as those described in Algorithm Description of Joint Exploration Test Model 6 (JEM 6, Document: JVET-F1001-v3) include using illumination compensation (IC) parameters to compensate variations in illumination (e.g., brightness) between the current block being encoded or decoded and at least one prediction block. In particular, an L-shape template is used to select neighboring samples for calculating the IC parameters in an inter coding mode as shown in FIG. 6. The IC parameters are estimated by comparing the reconstructed neighboring samples (i.e., samples in L-shape-cur region 602' of a current block 603') with the neighboring samples (samples in L-shape-ref-i region, 602") of the reference-i block (i=0 or 1) 603". Note that in order to reduce the computational complexity, the reference-i block here is not exactly the prediction block, rather, the reference-i block is based on an integer version of the motion vector (i.e., full-pel precision) not using motion compensation interpolation filters. The IC parameters minimize the difference between the samples in the L-shape-cur 602' and the samples in the L-shape-ref-i 602" adjusted with the IC parameters.

That is, in inter prediction encoding or decoding, the current block 603' uses motion information (e.g., a motion vector $MV_{cur}$ and a reference picture index i identifying one reference picture in, for example, a decoded picture buffer) to build the prediction block using the motion compensation (MC) process. Further, the prediction block is adjusted by the IC parameters. Given a prediction block obtained using the ith reference picture (ref-i), the IC parameters are estimated by comparing the reconstructed neighboring samples in L-shape-cur 602' with the neighboring samples in L-shape-ref-i 602" of the ref-i block (i=0 or 1) as depicted in FIG. 6.

The IC parameters may be estimated by minimizing the mean square error/difference (MSE) between the samples in the L-shape-cur 602' and the samples of the L-shape-ref-i 602" adjusted with IC parameters. Typically, the IC model is linear, e.g., $$IC(y)=ay+b, \qquad (1)$$

where a is a slope parameter and b is an intercept parameter. The IC parameters $(a_i, b_i)$ may then be obtained as shown below:

$$(a_i, b_i) = \underset{(a,b)}{\operatorname{argmin}} \left( \sum_{\substack{x \in L\text{-}shape\text{-}cur, \\ y \in L\text{-}shape\text{-}ref\text{-}i}} (x - ay - b)^2 \right) \quad (2)$$

where x is a reconstructed sample in the L-shape template in the current picture, y is a sample in the L-shape template in the reference picture, which can be obtained via motion compensation with $MV_{cur}$ or modified $MV_{cur}$ (e.g., a lower precision of $MV_{cur}$). In Eq. (2), x and y are samples situated in the same location inside the L-shape templates as illustrated in FIG. 6 (see e.g., x 605' and y 605" pair). In the case of a bi-prediction, the IC parameters ($a_0$, $b_0$) and ($a_1$, $b_1$) are derived independently from L-shape-ref-0 and from L-shape-ref-1 respectively. In the bitstream, when IC is enabled for the current slice, picture or sequence, an indication such as, e.g., an IC flag may be encoded per block to indicate whether IC is enabled for this block or not.

Figure 7:
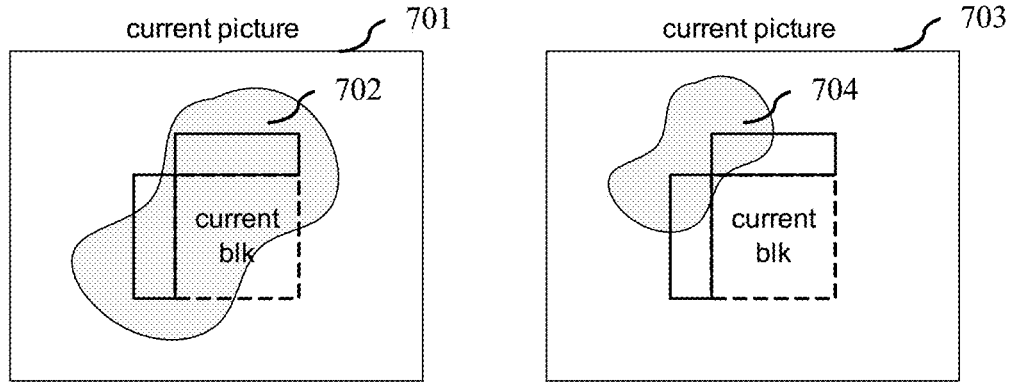
FIG. 7 illustrates two examples of neighboring samples in the L-shape template and the current block, with respect to an object.

One reason that IC may improve the compression efficiency is that the IC parameters, which are optimized for the neighboring samples, may remain suited for the current block. This is true in general since the neighboring samples in the L-shape template are the closest available reconstructed samples to the current block. However, if some of the neighboring samples belong to different objects than the current block, as illustrated in an example in FIG. 7, then these neighboring samples are less likely to provide good IC parameter estimation. In the picture 701 on the left of FIG. 7, the object 702 encompasses large sections of the L-shape template and of the current block. On the other hand, in current picture 703, the object 704 only encompasses the L-shape template and hardly includes any section of the current block. Hence, in the case of current block as shown in picture 703, the samples of the L-shape template may not be well suited for estimating the IC parameters for the current block.

The present embodiments are directed to methods and apparatus for adaptively choosing the neighboring samples to be used to derive the IC parameters, such that the IC process can more effectively improve the current block prediction. In particular, techniques are proposed to improve block-based IC by varying the selection of reconstructed neighboring samples used to estimate IC parameters so that they may be better correlated with the current block samples.

Figure 8:
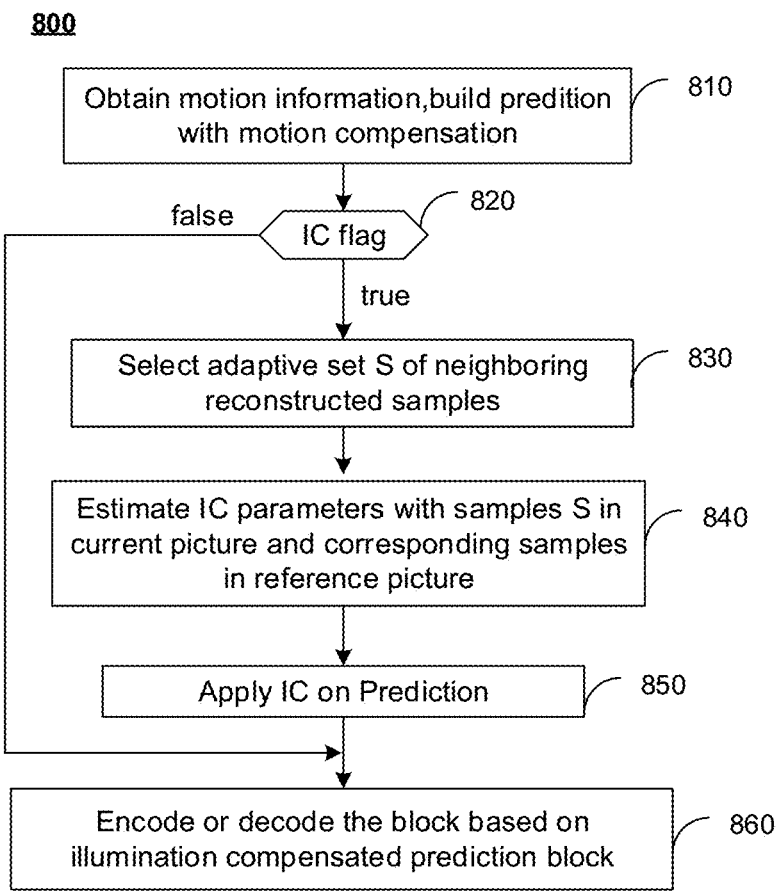
FIG. 8 illustrates an exemplary process of selecting reconstructed neighboring samples for calculating IC parameters, according to a general aspect of at least one embodiment.

FIG. 8 illustrates an exemplary process 800 for selecting reconstructed neighboring samples for calculating IC parameters, according to an embodiment. At step 810, for a current block, the motion information (e.g., MV, reference picture index) is obtained and used to build prediction information with the motion compensation (MC) process. At step 820, if IC is being used such as being indicated by an IC flag, then the IC flag is checked to see if it is true or false. If the IC flag is true, then a set S of neighboring reconstructed samples is selected (830). Different from a fixed L-shape template as used in JEM 6, the set S of neighboring samples will be varied adaptively in order to improve the IC process. For example, in one exemplary aspect, the selection of the set S of neighboring samples will be based on information used to reconstruct one or more neighboring reconstructed blocks. Details of various exemplary embodiments to select the set S of neighboring samples will be described below.

At step 840, IC parameters are estimated with the selected set S of neighboring samples and corresponding samples in the reference picture. Here, the corresponding samples in the reference picture may be chosen as the neighboring samples of the prediction block for the current block. To simplify the computation, the encoder or decoder may choose corresponding samples around a particular block in the reference picture, where the particular block is pointed to by the motion vector of the current block ($MV_{cur}$) at a lower precision (e.g., integer full-pel version, or half-pel). The set of corresponding samples in the reference picture typically have the same shape as the sample set S for the current block. At step 850, the estimated IC parameters are used for the illumination compensation for the prediction of the current block, i.e., adjusted based on the IC function, for example, the samples in the prediction block are adjusted using Eq. (1). At step 860, the prediction block after illumination compensation is used to encode or decode the current block.

Method 800 can be used at the encoder or decoder. In order for the bitstream to be properly decoded, the same IC parameter estimation method should be used at the encoder and decoder.

When method 800 is used at the encoder side, the motion information can be obtained (810) from the motion estimation process. The motion estimation may or may not consider illumination compensation. The motion estimation process may also decide whether or not to use IC, e.g., by setting the IC flag to true or false, in addition to outputting the motion information. After the prediction block is illumination compensated (850), the prediction residuals, namely, the difference between the current block and the illumination compensated prediction block, can be transformed and quantized to form transform coefficients. With adaptive selection of neighboring sample set S for IC, the prediction residuals may become smaller and therefore can be encoded with fewer bits. Information, including transform coefficients, motion information and IC flag, may then be encoded (860) into the bitstream. Alternatively, the IC flag is not explicitly encoded and may be inferred from other decoded information at the decoder side.

When method 800 is used at the decoder side, the motion information may be decoded (810) from the bitstream, for example, using the merge mode or AMVP. The IC flag can also be decoded (820) from the bitstream. After the prediction block is illumination compensated (850), the prediction block can be added to prediction residuals in order to decode (860) the current block.

In one exemplary embodiment, the current block uses motion information such as, e.g., motion vector and reference picture information to build the prediction using motion compensation process in the inter mode. This motion information is stored by the encoder or decoder so that it can be used to encoder or decode other blocks. In particular, the motion information of the neighboring blocks can be used to derive which neighboring samples are to be used for IC parameter calculation.

Figure 9:
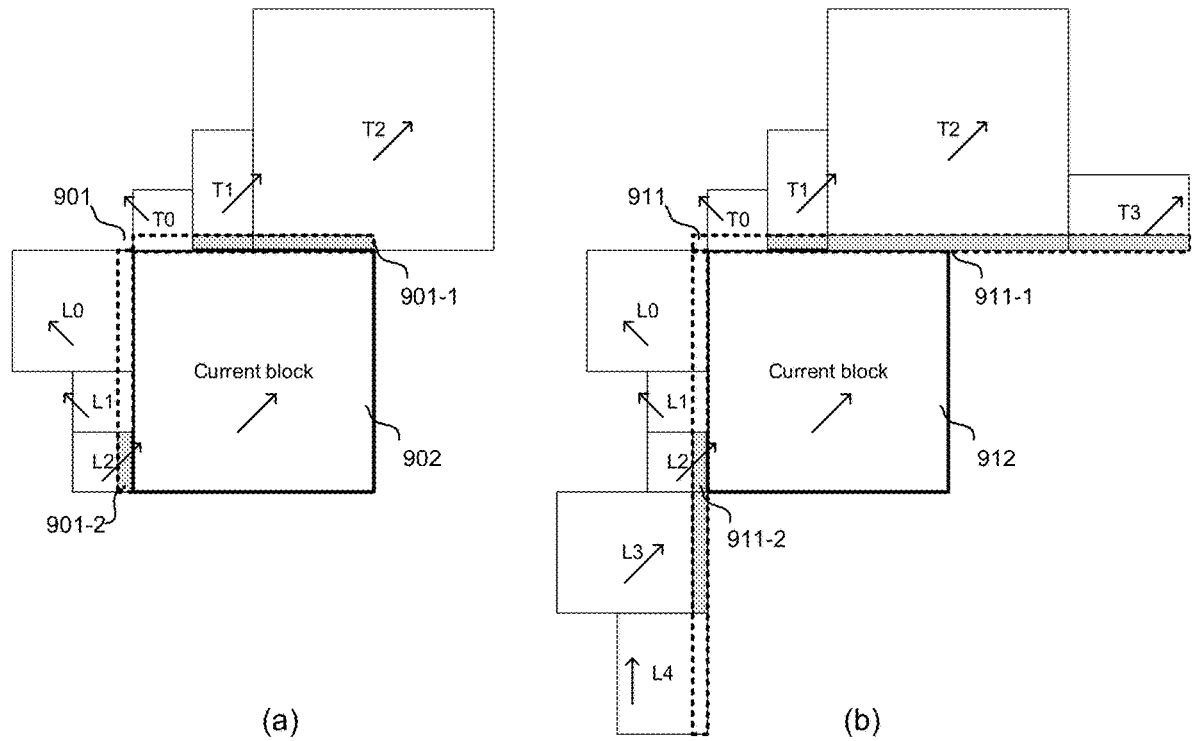
FIG. 9($a$) and FIG. 9($b$) illustrate two examples of selection of a plurality of samples for IC parameter calculation, according to a general aspect of at least one embodiment.

FIG. 9 illustrates motion information of an exemplary current block and several neighboring blocks. It is noted that neighboring blocks can have different sizes. In FIG. 9(*a*), the L-shape template used in the current JEM is shown in dashed lines. In this example, neighboring samples on the top part 901-1 of the L-shape template 901 belong to neighboring blocks T0, T1 and T2, and neighboring samples on the left part 901-2 of the L-shape template 901 belong to the blocks L0, L1 and L2. Furthermore, according to this exemplary embodiment, only the neighboring samples belonging to a block (such as one or more of T0, T1, T2, L0, L1 and L2), which shares the same reference picture as the current block and/or has a MV value close to the MV value of the current block, will be selected for the derivation of the IC parameters for the current block.

In the above example, only samples from neighboring blocks with samples immediately adjacent to the current block can be selected. In other embodiments, samples from other reconstructed neighboring blocks can be selected. For example, as shown in FIG. 9(b), a different L-shape is shown in dashed line which corresponds to an L-shape extended to further include top-left, bottom-left, or top-right neighboring blocks. In this example, neighboring samples on the top part 911-1 of the L-shape template 911 belong to neighboring blocks T0, T1, T2 and T3, and neighboring samples on the left part 911-2 of the L-shape template 911 belong to blocks L0, L1, L2, L3 and L4.

Also, the L-shape thickness can be one or more samples. For instance, if thickness is 2 samples, the L-shape top part has two lines of samples and the L-shape left part has two columns of samples. In addition, the L-shape may be sub-sampled. For example, only one line among two lines from the top, or one column from two columns on the left, will be selected. This is advantageous in the case where the L-shape is very large in order to 1) speed up the calculation and 2) to simplify the computation of IC parameters, since the algorithm for deriving IC (based on least squares typically) may use sum of square of sample values and hence need sufficient range number to store some number values. The L-shape can also have different thickness on the left and on the top, or the template may take a different shape from the L-shape. Alternatively, samples from the selected neighboring reconstructed blocks may be selected, with possible sub-samplings, and be used for IC parameter calculation without the constraint of the L-shape template.

Figure 10:
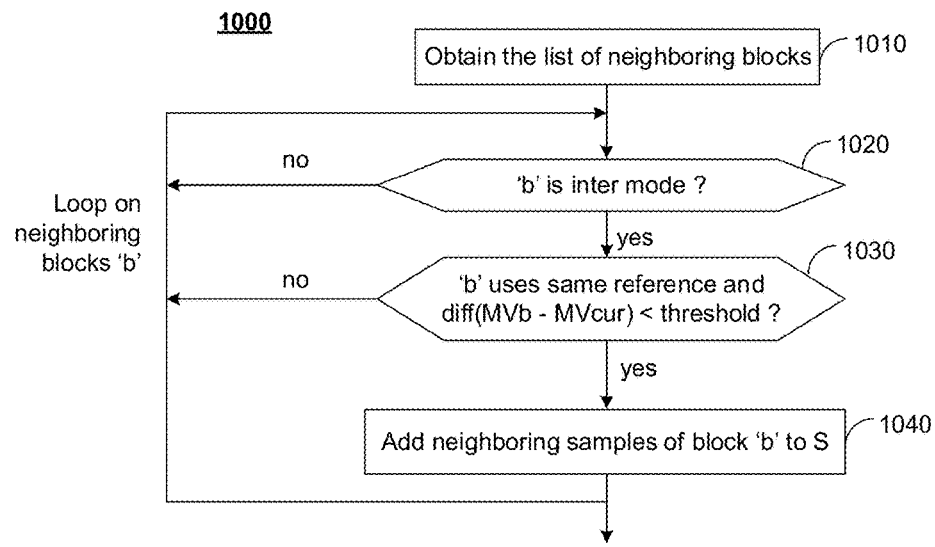
FIG. 10 illustrates an exemplary process for selecting neighboring samples for IC parameter calculation, according to a general aspect of at least one embodiment.

FIG. 10 illustrates an exemplary process 1000 for selecting neighboring samples for IC parameter calculation, according to an embodiment. Method 1000 can be used in step 830 of method 800. At step 1010, the list of neighboring blocks of the current block is obtained. As shown in FIG. 9(a), the list may contain top neighboring blocks (e.g., T0, T1 and T2), and left neighboring blocks (e.g., L0, L1 and L2). At step 1020, a determination is first made to see if a neighboring block 'b' from the list of the plurality of neighboring blocks is inter coded. If the neighboring block 'b' is inter coded, then at step 1030, a determination is made to see if the block 'b' uses the same reference picture. In a non-limiting exemplary embodiment, a determination is also made to see whether a difference between a motion vector value (MVb) of the particular neighboring block 'b' and a motion vector value of the current block (MVcur) is less than a threshold. For example, the difference function can be the L2-norm $((MVb_x-MVcur_x)^2+(MVb_y-MVcur_y)^2)$ or the L1-norm with two thresholds $(|MVb_x-MVcur_x|<THx$ and $|MVb_y-MVcur_y|<Thy$, or $MIN(|MVb_x-MVcur_x|,|MVb_y-MVcur_y|)<TH)$. If the determination at step 1030 is affirmative, then at step 1040, the neighboring samples in the L-shape template belonging to the particular block 'b' are added to the selected sample set S. The process 1000 then loops back to step 1020 until all of the neighboring blocks (e.g., T0, T1, T2, L0, L1 and L2) have been tested.

In one example, because neighboring blocks L2, T1 and T2 share the same reference picture as the current block 902, and the MV values of these blocks are close to the MV value of the current block, only neighboring samples in the L-shape template region 901 and belonging to these blocks are selected for the set S. Referring back to FIG. 9(a), the selected samples S are indicated as shaded in the L-shape template 901.

In another example, because neighboring blocks L2, L3, T1, T2 and T3 share the same reference frame as the current block 912, and the MV values of these blocks are close to the MV value of the current block, only neighboring samples, in the L-shape template region 911, which belong to these blocks are selected for the set S. Referring back to FIG. 9(b), the selected samples are indicated as shaded in the L-shape template 911.

In addition to the motion vector value and the reference picture information, other motion information can also be used for selecting the neighboring sample set S. In different embodiments, the neighboring sample set S for IC calculation can be based on whether the current block is indicated to inherit the same motion vector as a neighboring block, such as in the merge mode, or to derive the motion vector based on a motion vector of a neighboring block and MVD, such as in the AMVP or FRUC mode.

Figure 11:
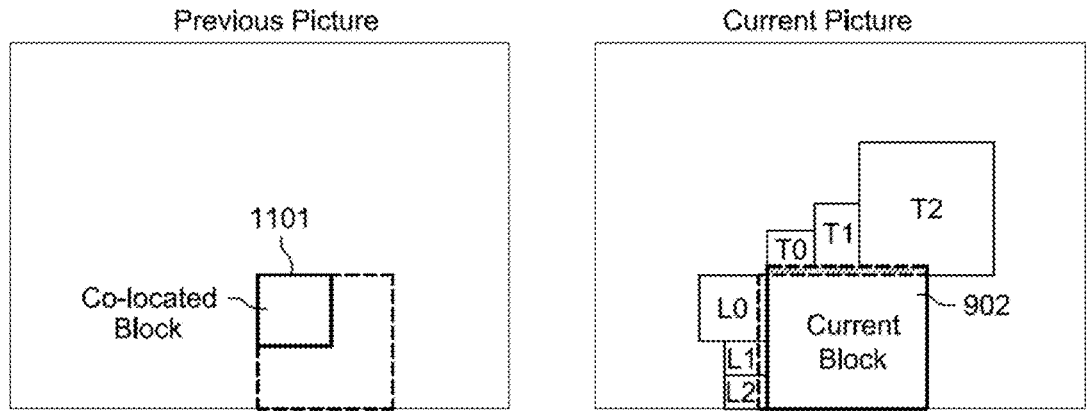
FIG. 11 illustrates exemplary derivation of a motion vector in merge mode.

FIG. 11 illustrates an exemplary embodiment in which a current block such as block 902 (also shown in FIG. 9(a)) that is being encoded or decoded may use the merge mode information to select the neighboring samples. In the merge mode, some information such as motion information (e.g., motion vector and/or reference index) is not decoded from the bitstream, but inherited from the neighboring block previously decoded. For example, in HEVC merge mode, the decoder builds a list of merge candidates containing motion information of neighboring blocks (e.g., T0, T1, T2, L0, L1 and L2) data and co-located block(s) (e.g., 1101) data previously decoded. The decoder also decodes a merge index that indicates from which candidate block the current block will inherit motion information.

In an exemplary embodiment, if the merge index indicates a neighboring block situated above the current block, then the set of the samples S is selected to be equal to the entire upper part of the L-shape template. On the other hand, if the merge index indicates a block situated to the left of the current block, then the set of the samples S is selected to be equal to the entire left part of the L-shape. Referring back to the example as shown in FIG. 11, if the merge index indicates neighboring block T2, the upper part of the L-shape is chosen, as shaded in the L-shape template 902. In a different embodiment, instead of choosing the entire upper or left part of the L-shape, the portion of the upper of left part that belongs to the neighboring block indicated by the merge index can be chosen.

Figure 12:
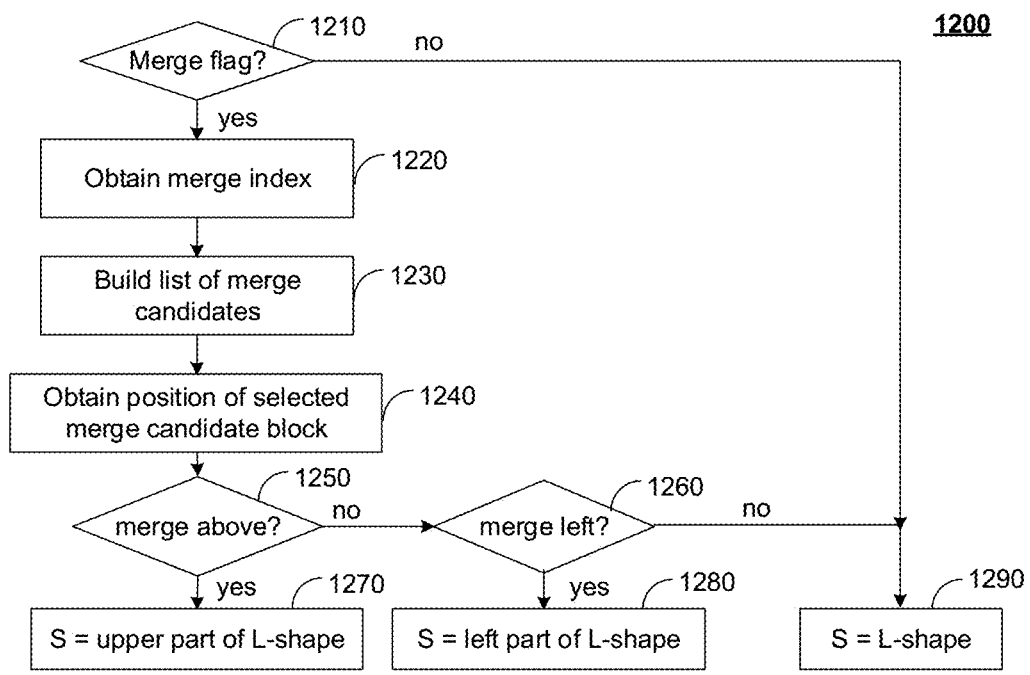
FIG. 12 illustrates an exemplary process for using the merge mode information to select neighboring samples for IC parameter calculation, according to a general aspect of at least one embodiment.

FIG. 12 illustrates an exemplary process 1200 for using the merge mode information for selecting the set S for IC parameter calculation, according to an embodiment. Method 1200 can be used for step 830 in method 800. At step 1210, it is first determined if a merge flag is present indicating the use of the merge mode for the codec. The merge flag can be coded in the bitstream or inferred from other decoded information. If yes, then at 1220, the corresponding merge index is obtained. At step 1230, a list of the merge candidates is built as described above in connection with FIG. 11. At step 1240, the position of the selected merge candidate block for the current block is obtained. At steps 1250 and 1270, if the selected merge candidate block is situated above the current block, then the set of the samples S is selected to be equal to the upper part of the L-shape template. On the other hand, at steps 1260 and 1280, if the merge index indicates a block situated to the left of the current block, then the set of the samples S is selected to be equal to the left part of the L-shape. In other cases, at step 1290, the samples S is selected to be equal to the L-shape.

In some coding modes, the current motion information is decoded or encoded using the motion information of the neighboring blocks, for example, based on a motion vector predictor selected from motion vectors for reconstructed neighboring blocks and an MVD, which can be coded in the bitstream (e.g., in AMVP mode of JEM), or can be built with motion vector refinement (e.g., in FRUC mode of JEM). For example, in AMVP mode, an AMVP list of motion information candidates is built using the motion information of the neighboring blocks and an MV predictor index is encoded or decoded. The current motion vector is derived (i.e., current motion vector is predicted) from the motion vector corresponding to the MV predictor index. Accordingly, in an exemplary embodiment, if the MV predictor index indicates a neighboring block above the current block, then the set of samples S is equal to the upper part of the L-shape template. On the other hand, if the MV predictor index indicates a neighboring block to the left of the current block, then the set S of samples is equal to the left part of the L-shape template.

In addition, in some coding modes, the motion vectors are not coded but are derived at the decoder side using the FRUC (Frame Rate-Up Conversion) mode. As shown in an example in FIG. 5, in FRUC mode, a list of MV candidates is built and the decoder will finally select the MV (best_MV) that minimizes the difference between the motion compensated reference L-shape template (ref0) and the current reconstructed L-shape (rec). The best_MV is used to derive the current motion information. In one embodiment, if best_MV comes from a neighboring block above the current block, then the set S is set to the upper part of the L-shape. If the best_MV comes from a neighboring block to the left of the current block, then the set S is set to the left part of the L-shape.

Figure 13:
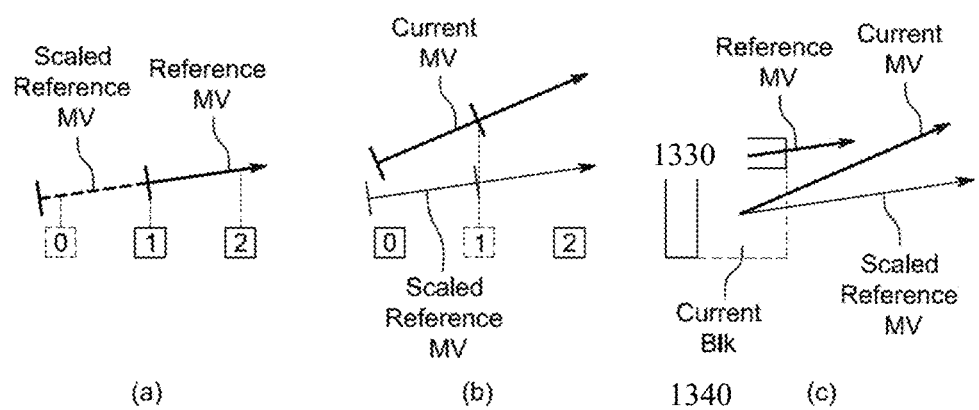
FIG. 13($a$), FIG. 13($b$) and FIG. 13($c$) illustrate pictorial examples for scaling motion vectors.

Also, as described before, a candidate motion vector may be scaled, e.g., according to the distance (tb) between the current picture and the reference picture of the current PU and the distance (td) between the current picture and the reference picture of the spatial candidate. Accordingly, in one exemplary aspect, for all the neighboring blocks coded in inter mode (including AMVP and FRUC), the MV candidates are scaled so as to be expressed with the same reference picture as the current block reference picture as illustrated in FIG. 13. FIG. 13(a) shows, for example, a reference MV between a neighboring block with POC=1 and a corresponding reference block with POC=2. FIG. 13(b) shows an MV of a current block with POC=0 and a corresponding reference block with POC=2. FIG. 13(c) shows the reference MV scaled between POC=0 and POC=2. Then the set of the samples S is built with the neighboring samples for which the scaled MVs are close to the current MV. The difference calculation based on the scaled MV can be used in step 1030 of method 1000.

Figure 14:
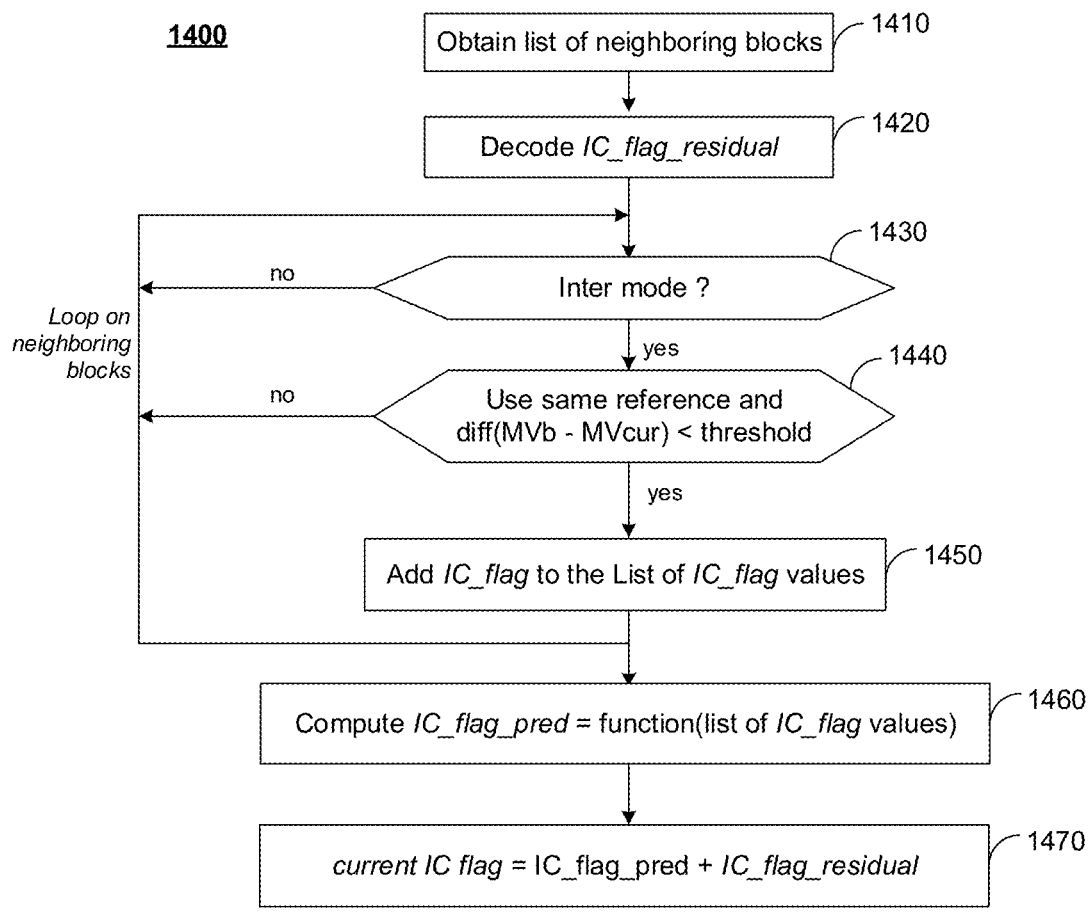
FIG. 14 illustrates an exemplary process of predicting IC flags, according to a general aspect of at least one embodiment.

FIG. 14 illustrates an exemplary process 1400 for predicting the value of the IC flag from the IC flag values of the neighboring blocks, according to an embodiment. The prediction of the IC flag value (IC_flag_pred in FIG. 14) is a function of a list of IC flag values, where the list is built the same way as for previous embodiments. For example, the list of IC flag values is built with the IC flag values of the reconstructed neighboring blocks having samples belonging to the L-shape. In one exemplary embodiment, the IC flag is not directly coded but the residual IC flag value (IC_flag_residual in FIG. 14) is coded instead, which is the difference between the actual IC flag value and a predictive IC flag value (IC_flag_pred in FIG. 14). In another exemplary aspect, the predictive IC flag value is set to the median of all the IC flag values of the neighboring blocks having the same reference as the current block and/or having a MV close to the current MV value, where the MV may be scaled as previously described. The advantage of predicting IC flag with a value that is likely to be the same as the IC flag value is that the entropy of IC_flag_residual may become very small (smaller than IC flag itself) and consequently may need fewer bits to encode, with CABAC for example.

Referring back to FIG. 14, at step 1410, a list of neighboring blocks is first obtained. At step 1420, IC_flag_residual is decoded. Then a loop consists of steps 1430 to 1450 is executed for each block in the list of the neighboring blocks. At step 1430, it is determined whether the particular neighboring block is coded in the inter mode. If yes, at 1440, another determination is made to see if this neighboring block uses the same reference as the current block and/or if a difference between the motion vector value of the particular neighboring block and a motion vector value of the current block is less than a threshold. If the determination is yes, then the IC_flag of this particular neighboring block is added to the list of the IC_flag values to be used for the derivation of the IC_flag corresponding to the current block being encoded or decoded. At 1460, IC_flag_pred may be computed as a function of the list of the IC_flag values, according to the exemplary functions as described above. At 1470, the IC_flag for the current block is set to the sum of the IC_flag_pred and IC_flag_residual.

Different methods of determining the IC parameters, for example, but not limited to, those used in JEM and the methods according to the present embodiments, can be applied when OBMC (Overlapping Block Motion Compensation) is used for motion compensation. In block-based video coding, the technique of OBMC can be used to reduce blockiness artifact at the coding unit (CU) borders.

When OBMC is applied to the current block, besides motion information (e.g., motion vector and reference picture index) for the current block, motion information of neighboring blocks, if available and is not identical to the current motion information, is also used to derive prediction block for the current block. These multiple prediction blocks based on multiple motion information are combined to generate the final prediction signal of the current block. Prediction block based on motion information of a neighboring block is denoted as $P_N$, with N indicating an index for the neighbouring blocks (e.g., above, below, left and right blocks), and prediction block based on motion information of the current block is denoted as $P_C$. It should be noted that when IC is used, IC parameters are also used in forming the prediction blocks ($P_C$, $P_N$).

When OBMC is enabled, it is applied for each sample s of the current CU boundary areas (top and left). The top boundary area refers to samples in the first d top rows of the current block, the left boundary area refers to samples in the first d left columns of the current block (d is equal to 2 for luma and 4 for chroma for example).

Figure 16:
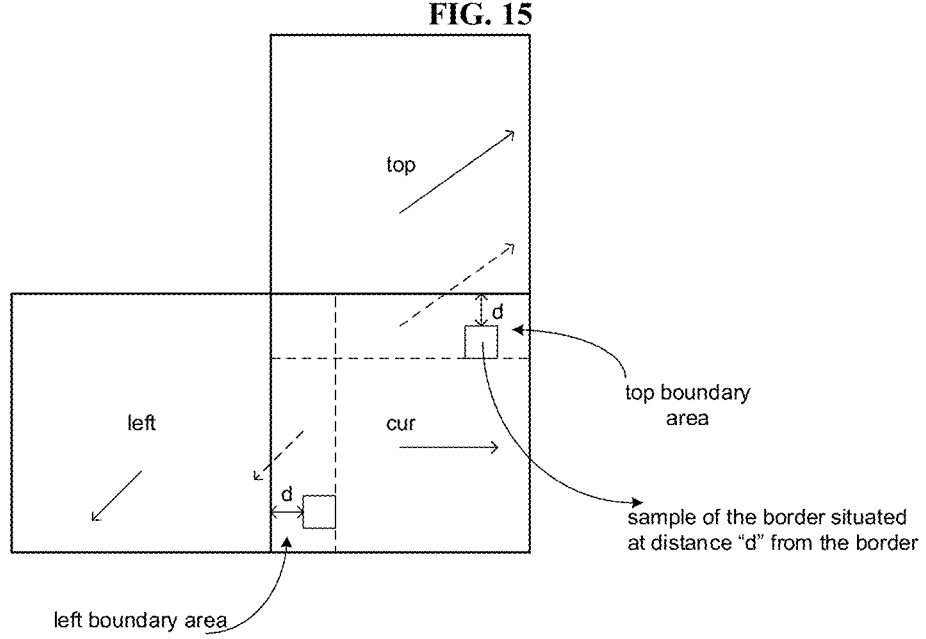
FIG. 16 illustrates an example where a weighted sum of predictions is used to generate a final prediction.
Figure 17:
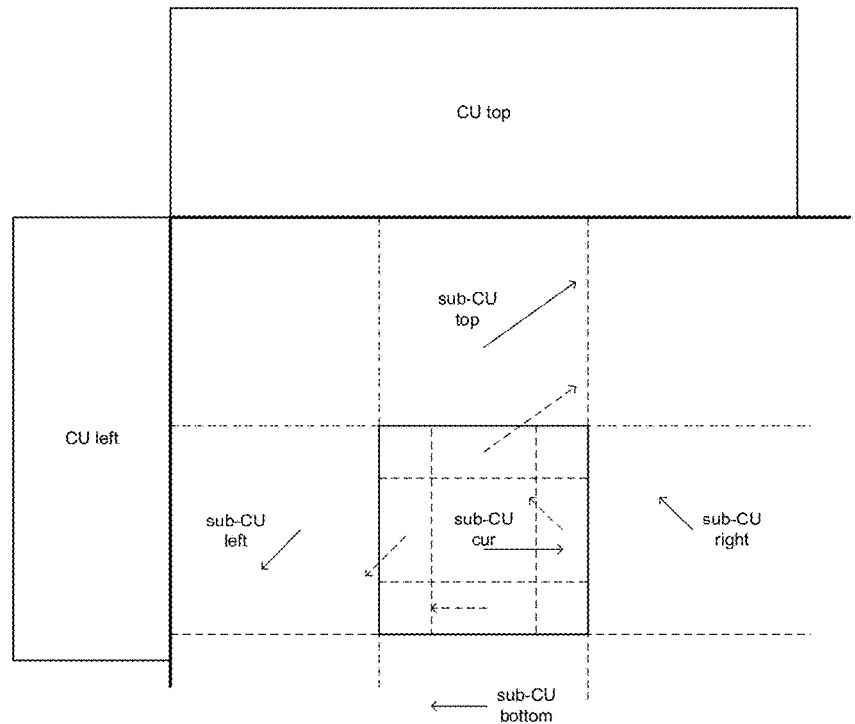
FIG. 17 illustrates an example of OBMC boundary areas when a CU is divided into multiple sub-CUs.

For each sample of the boundary areas, a weighted sum of the prediction $P_C(s)$ and prediction $P_N(s)$ can be used to generate the final prediction ($P_{OBMC}(s)$), as shown in FIG. 16:

If s belongs to one boundary area: $P_{OBMC}(s)=w(d)\cdot P_C(s)+(1-w(d))\cdot P_N(s)$ If s belongs to two boundary areas: $P_{OBMC}(s)=(w(d_1)+w(d_2))\cdot P_C(s)+(1-w(d_1))\cdot P_{N1}(s)+(1-w(d_2))\cdot P_{N2}(s)$ In case of sub-CU coding where the current CU is divided into multiple sub-CUs, OBMC is applied to each sub-CU and one may have right and bottom OBMC boundary areas too (as shown in FIG. 17). An example of sub-CU coding mode is the Affine mode, where the motion vectors of each sub-CU are interpolated within the CU.

OBMC and Illumination Compensation (IC)

Figure 18:
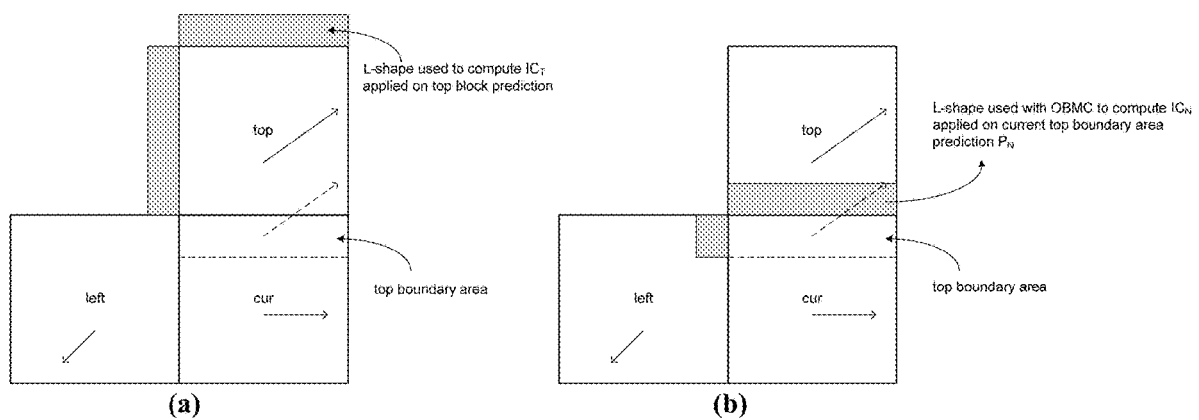
FIG. 18 illustrates an example where the top block uses IC to compute its prediction, whereas the current block does not use IC to build the prediction.

As implemented in JEM, if the neighboring CU uses Illumination Compensation (IC), then the determination of the IC parameters is performed when computing the prediction block for the top neighboring block (step-1, FIG. 18(*a*)), and is also performed for computing $P_N(s)$ for the current block for samples bordering top neighbor CU (step-2, FIG. 18(*b*)).

In particular, FIG. 18 illustrates the case where the top block uses IC to compute its prediction $P_T$ (with $IC_T$ parameters), whereas the current block does not use IC to build the prediction $P_C$. But $P_N$ uses IC because the neighboring top block uses IC. $P_T$ and $P_N$ use same motion information.

If the current block had also used IC, IC parameters ($IC_C$) would have been determined for the current block and would have been applied for computing $P_C$. But $IC_C$ is not used ($IC_N$ is used) by the OBMC process for the computation of $P_N$.

Figure 19:
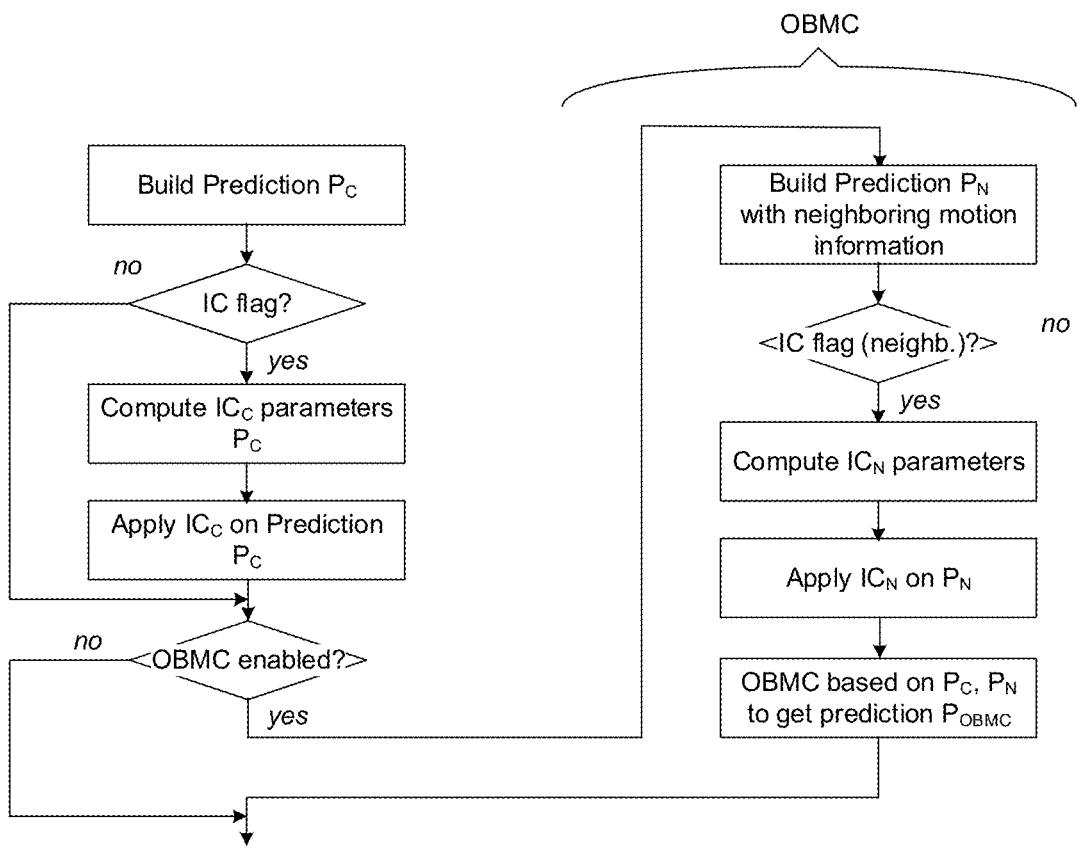
FIG. 19 illustrates an example where the computation of IC parameters is performed twice when OBMC involves neighboring CUs using IC.

Thus, when OBMC involves neighboring CUs using IC, the computation of the IC parameters is performed twice, as also illustrated in FIG. 19, using different L-shapes (see steps 1-2 in FIG. 18) but with same motion information, which may result in two issues:

- The complexity (amount of computation) can be significant compared to OBMC without IC.
- The IC parameters of step-1 and step-2 can be different, which may induce discontinuity at the CU border, whereas the purpose of OBMC was actually to reduce border discontinuity.

Figure 20:
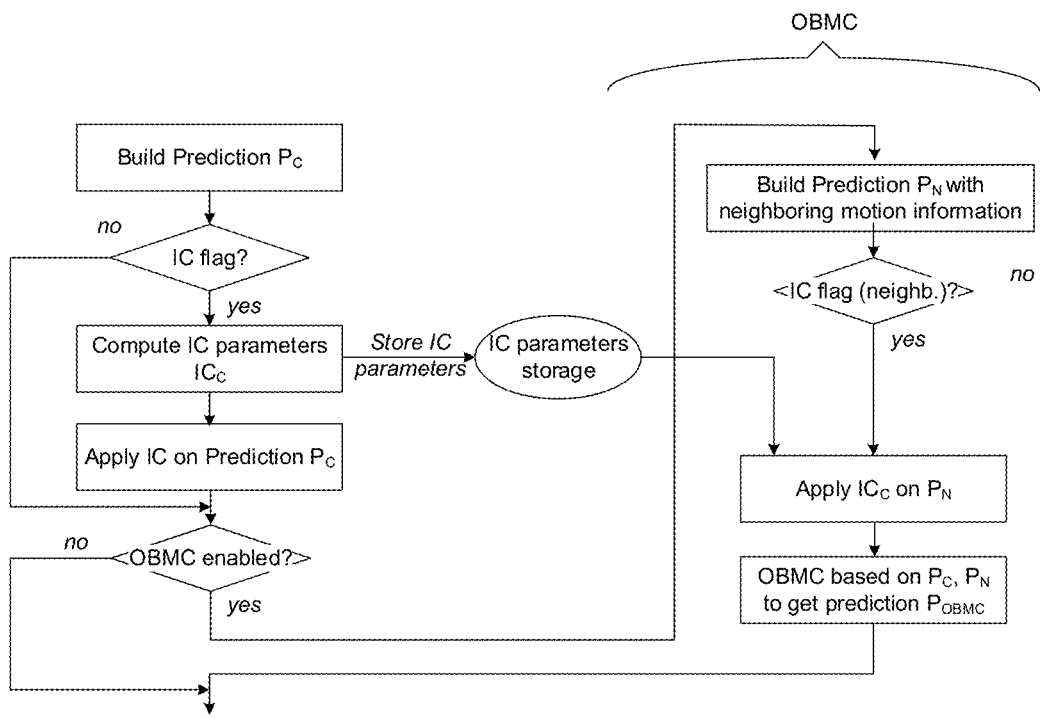
FIG. 20 illustrates an example where the IC parameters computed for reconstructing the current CUs can be stored so that they can be re-used for computing OBMC for subsequent CUs.

To address the issues of OBMC with IC mode caused by using different IC parameters for OBMC of the current block as the ones computed for the reconstruction of the neighboring CU, the IC parameters computed for reconstructing the current CUs can be stored so that they can be re-used for computing OBMC for subsequent CUs as illustrated in FIG. 20.

Considering the example of FIG. 18, first the top CU is decoded/reconstructed. Since it uses IC, then the $IC_T$ parameters are determined and applied to the prediction $P_T$. Then the $IC_T$ parameters are stored in "IC parameters storage". Later, the current CU is decoded. The current prediction is built as $P_C$. Next OBMC process starts for the top boundary area: since the neighboring top CU uses IC, then $IC_T$ parameters are retrieved from the "IC parameters storage" and they are used to build $P_N$. Finally, $P_{OBMC}$ is built by a weighted sum of $P_C$ and $P_N$. Same OBMC process is performed with left boundary area and the left neighbor CU.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of IC parameters, or the thickness (in the unit of the number of samples) of the L-shape template. It should be noted that the specific values are for exemplary purposes and the present embodiments are not limited to these specific values.

Various methods of selecting neighboring reconstructed samples for IC parameter calculation as described above can be used to modify the motion estimation and compensation modules (170, 175, 375) of the JVET or HEVC encoder and decoder as shown in FIG. 1 and FIG. 3. Moreover, the present embodiments are not limited to JVET or HEVC, and can be applied to other standards, recommendations, and extensions thereof. Various embodiments described above can be used individually or in combination.

In addition, in different embodiments, the IC model may use other linear or non-linear functions of the IC parameters. For example, the IC model may only consider the slope parameter without the intercept parameter, i.e. IC(y)=a*y. In another example, the IC model may have more than two parameters, depending on the function (e.g., depending on the degree of a polynomial function). To estimate the IC parameters, instead of the MSE as shown in Eq. (2), an absolute difference or other difference functions can be used. The present embodiments can also be applied when illumination compensation is used for intra coding.

Figure 15:
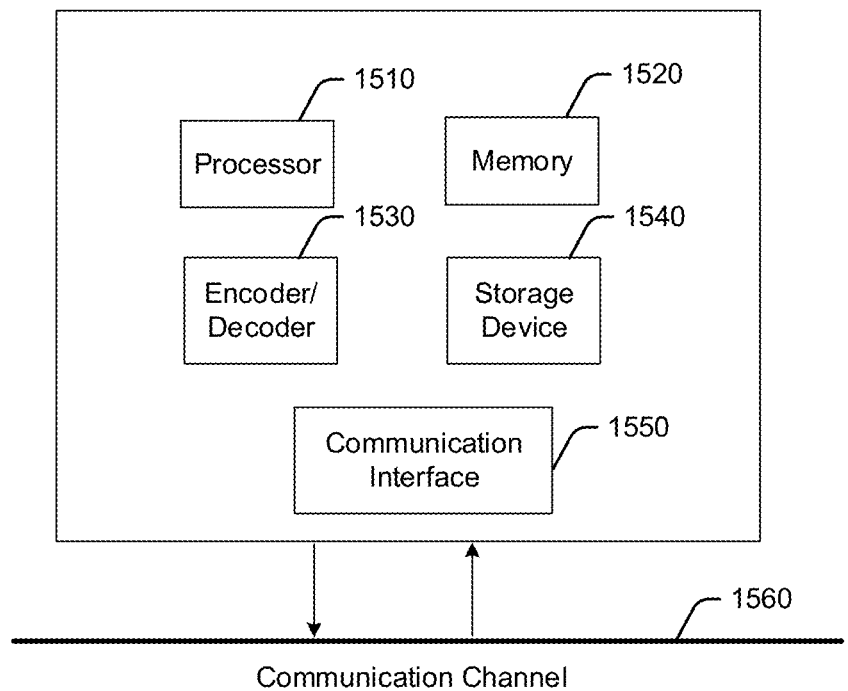
FIG. 15 illustrates a block diagram of a system within which aspects of the present embodiments can be implemented.

FIG. 15 illustrates a block diagram of an exemplary system 1500 in which various aspects of the exemplary embodiments may be implemented. The system 1500 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1500 may be communicatively coupled to other similar systems, and to a display via a communication channel as shown in FIG. 15 and as known by those skilled in the art to implement all or part of the exemplary video systems described above.

Various embodiments of the system 1500 include at least one processor 1510 configured to execute instructions loaded therein for implementing the various processes as discussed above. The processor 1510 may include embedded memory, input output interface, and various other circuitries as known in the art. The system 1500 may also include at least one memory 1520 (e.g., a volatile memory device, a non-volatile memory device). The system 1500 may additionally include a storage device 1540, which may include non-volatile memory, including, but not limited to, EEPROM, ROM, PROM, RAM, DRAM, SRAM, flash, magnetic disk drive, and/or optical disk drive. The storage device 1540 may comprise an internal storage device, an attached storage device, and/or a network accessible storage device, as non-limiting examples. The system 1500 may also include an encoder/decoder module 1530 configured to process data to provide encoded video and/or decoded video, and the encoder/decoder module 1530 may include its own processor and memory.

The encoder/decoder module 1530 represents the module(s) that may be included in a device to perform the encoding and/or decoding functions. As is known, such a device may include one or both of the encoding and decoding modules. Additionally, the encoder/decoder module 1530 may be implemented as a separate element of the system 1500 or may be incorporated within one or more processors 1510 as a combination of hardware and software as known to those skilled in the art.

Program code to be loaded onto one or more processors 1510 to perform the various processes described hereinabove may be stored in the storage device 1540 and subsequently loaded onto the memory 1520 for execution by the processors 1510. In accordance with the exemplary embodiments, one or more of the processor(s) 1510, the memory 1520, the storage device 1540, and the encoder/decoder module 1530 may store one or more of the various items during the performance of the processes discussed herein above, including, but not limited to the input video, the decoded video, the bitstream, equations, formulas, matrices, variables, operations, and operational logic.

The system 1500 may also include a communication interface 1550 that enables communication with other devices via a communication channel 1560. The communication interface 1550 may include, but is not limited to a transceiver configured to transmit and receive data from the communication channel 1560. The communication interface 1550 may include, but is not limited to, a modem or network card and the communication channel 1550 may be implemented within a wired and/or wireless medium. The various components of the system 1500 may be connected or communicatively coupled together (not shown in FIG. 15) using various suitable connections, including, but not limited to internal buses, wires, and printed circuit boards.

The exemplary embodiments may be carried out by computer software implemented by the processor 1510 or by hardware, or by a combination of hardware and software. As a non-limiting example, the exemplary embodiments may be implemented by one or more integrated circuits. The memory 1520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1510 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for encoding video data, comprising:
   selecting in a picture, for a block to be encoded in said picture, a set of neighboring samples from a plurality of neighboring reconstructed blocks of said block, based on motion information of said block to be encoded and motion information used to reconstruct said plurality of neighboring reconstructed blocks, wherein one or more samples of a particular block of said plurality of neighboring reconstructed blocks are included in said set of neighboring samples, responsive to a difference between a motion vector value of said particular block of said plurality of neighboring reconstructed blocks and a motion vector value of said block to be encoded being less than a threshold;
   selecting another set of samples, corresponding to said set of neighboring samples, from a reference picture;
   determining one or more illumination compensation parameters for said block to be encoded, based on said selected set of neighboring samples and said selected another set of samples;
   applying illumination compensation to a prediction block for said block based on said determined one or more illumination compensation parameters, to form an illumination compensated prediction block for said block to be encoded; and
   encoding said block to be encoded using said illumination compensated prediction block.

2. The method of claim 1, wherein said motion information used to reconstruct said plurality of neighboring reconstructed blocks is also used to reconstruct said block to be encoded.

3. The method of claim 1, wherein said motion information used to reconstruct said plurality of neighboring reconstructed blocks comprises one or more of: (1) reference picture information of said plurality of neighboring reconstructed blocks and (2) motion vector information of said plurality of neighboring reconstructed blocks.

4. The method of claim 3, wherein said selecting said set of neighboring samples comprises, for a particular block of said plurality of neighboring reconstructed blocks:
including one or more samples of said particular block of said plurality of neighboring reconstructed blocks in said set of neighboring samples, responsive to said particular block of said plurality of neighboring reconstructed blocks sharing a same reference picture as said block to be encoded.

5. A method for decoding video data, comprising:
selecting in a picture, for a block to be decoded in said picture, a set of neighboring samples from a plurality of neighboring reconstructed blocks of said block, based on motion information used to reconstruct said block to be decoded and motion information used to reconstruct said plurality of neighboring reconstructed blocks, wherein one or more samples of a particular block of said plurality of neighboring reconstructed blocks are included in said set of neighboring samples, responsive to a difference between a motion vector value of said particular block of said plurality of neighboring reconstructed blocks and a motion vector value of said block to be decoded being less than a threshold;
selecting another set of samples, corresponding to said set of neighboring samples, from a reference picture;
determining, one or more illumination compensation parameters based on said selected set of neighboring samples and said selected another set of samples;
applying illumination compensation to a prediction block for said block to be decoded based on said determined one or more illumination compensation parameters, to form an illumination compensated prediction block for said block to be decoded; and
decoding said block to be decoded based on said illumination compensated prediction block.

6. The method of claim 5, wherein said motion information used to reconstruct said plurality of neighboring reconstructed blocks is also used to reconstruct said block to be decoded.

7. The method of claim 5, wherein said motion information used to reconstruct said plurality of neighboring reconstructed blocks comprises one or more of: (1) reference picture information of said plurality of neighboring reconstructed blocks and (2) motion vector information of said plurality of neighboring reconstructed blocks.

8. The method of claim 7, wherein said selecting said set of neighboring samples comprises, for a particular block of said plurality of neighboring reconstructed blocks:
including one or more samples of said particular block of said plurality of neighboring reconstructed blocks in said set of neighboring samples, responsive to said particular block of said plurality of neighboring reconstructed blocks sharing a same reference picture as said block to be decoded.

9. An apparatus for encoding video data, comprising:
one or more processors, wherein said one or more processors are configured to:
select in a picture, for a block to be encoded in said picture, a set of neighboring samples from a plurality of neighboring reconstructed blocks of said block, based on motion information of said block to be encoded and motion information used to reconstruct said plurality of neighboring reconstructed blocks, wherein one or more samples of a particular block of said plurality of neighboring reconstructed blocks are included in said set of neighboring samples, responsive to a difference between a motion vector value of said particular block of said plurality of neighboring reconstructed blocks and a motion vector value of said block to be encoded being less than a threshold;
select another set of samples, corresponding to said set of neighboring samples, from a reference picture;
determine one or more illumination compensation parameters for said block to be encoded, based on said selected set of neighboring samples and said selected another set of samples;
apply illumination compensation to a prediction block for said block based on said determined one or more illumination compensation parameters, to form an illumination compensated prediction block for said block to be encoded; and
encode said block to be encoded using said illumination compensated prediction block.

10. The apparatus of claim 9, wherein said motion information used to reconstruct said plurality of neighboring reconstructed blocks is also used to reconstruct said block to be encoded.

11. The apparatus of claim 9, wherein said motion information used to reconstruct said plurality of neighboring reconstructed blocks comprises one or more of: (1) reference picture information of said plurality of neighboring reconstructed blocks and (2) motion vector information of said plurality of neighboring reconstructed blocks.

12. The apparatus of claim 11, wherein said one or more processors are configured to select said set of neighboring samples by performing, for a particular block of said plurality of neighboring reconstructed blocks:
including one or more samples of said particular block of said plurality of neighboring reconstructed blocks in said set of neighboring samples, responsive to said particular block of said plurality of neighboring reconstructed blocks sharing a same reference picture as said block to be encoded.

13. An apparatus for decoding video data, comprising:
one or more processors, wherein said one or more processors are configured to:
select in a picture, for a block to be decoded in said picture, a set of neighboring samples from a plurality of neighboring reconstructed blocks of said block, based on motion information used to reconstruct said block to be decoded and motion information used to reconstruct said plurality of neighboring reconstructed blocks, wherein one or more samples of a particular block of said plurality of neighboring reconstructed blocks are included in said set of neighboring samples, responsive to a difference between a motion vector value of said particular block of said plurality of neighboring reconstructed blocks and a motion vector value of said block to be decoded being less than a threshold;
select another set of samples, corresponding to said set of neighboring samples, from a reference picture;
determine, one or more illumination compensation parameters based on said selected set of neighboring samples and said selected another set of samples;
apply illumination compensation to a prediction block for said block to be decoded based on said determined one or more illumination compensation parameters, to form an illumination compensated prediction block for said block to be decoded; and
decode said block to be decoded based on said illumination compensated prediction block.

14. The apparatus of claim 13, wherein said motion information used to reconstruct said plurality of neighboring reconstructed blocks is also used to reconstruct said block to be decoded.

15. The apparatus of claim 13, wherein said motion information used to reconstruct said plurality of neighboring reconstructed blocks comprises one or more of: (1) reference picture information of said plurality of neighboring reconstructed blocks and (2) motion vector information of said plurality of neighboring reconstructed blocks.

16. The apparatus of claim 15, wherein said one or more processors are configured to select said set of neighboring samples by performing, for a particular block of said plurality of neighboring reconstructed blocks:

including one or more samples of said particular block of said plurality of neighboring reconstructed blocks in said set of neighboring samples, responsive to said particular block of said plurality of neighboring reconstructed blocks sharing a same reference picture as said block to be decoded.

* * * * *